United States Patent
Lomnitz

(10) Patent No.: US 10,914,835 B2
(45) Date of Patent: Feb. 9, 2021

(54) SYSTEM, DEVICE AND METHOD FOR IMAGING OF OBJECTS USING SIGNAL CLUSTERING

(71) Applicant: VAYYAR IMAGING LTD., Yehud (IL)

(72) Inventor: Yuval Shamuel Lomnitz, Yehud (IL)

(73) Assignee: VAYYAR IMAGING LTD., Yehud (IL)

(*) Notice: Subject to any disclaimer, the term of this patent is extended or adjusted under 35 U.S.C. 154(b) by 0 days.

(21) Appl. No.: 16/548,100

(22) Filed: Aug. 22, 2019

(65) Prior Publication Data
US 2019/0377085 A1 Dec. 12, 2019

Related U.S. Application Data

(63) Continuation of application No. 15/363,716, filed on Nov. 29, 2016, now Pat. No. 10,436,896.

(60) Provisional application No. 62/260,582, filed on Nov. 29, 2015.

(51) Int. Cl.
*G01S 13/89* (2006.01)
*G01S 13/88* (2006.01)
*G06K 9/62* (2006.01)

(52) U.S. Cl.
CPC ............ *G01S 13/89* (2013.01); *G01S 13/888* (2013.01); *G06K 9/6247* (2013.01)

(58) Field of Classification Search
CPC ..... G01S 13/89; G01S 13/888; H04B 7/0413; H04B 17/12; G06K 9/6247
See application file for complete search history.

(56) References Cited

U.S. PATENT DOCUMENTS

| | | |
|---|---|---|
| 2,735,070 A | 2/1956 | Riblet |
| 4,010,715 A | 3/1977 | Robar et al. |
| 4,211,224 A | 7/1980 | Kubach |
| 4,211,911 A | 7/1980 | Dehn |
| 4,626,805 A | 12/1986 | Jones |
| 4,991,585 A | 2/1991 | Mawhinney |
| 5,039,824 A | 8/1991 | Takashima |
| 5,101,163 A | 3/1992 | Agar |
| 5,389,735 A | 2/1995 | Bockelman |

(Continued)

FOREIGN PATENT DOCUMENTS

| | | |
|---|---|---|
| EP | 1845364 A2 | 10/2007 |
| WO | 2014/080360 A2 | 5/2014 |

(Continued)

OTHER PUBLICATIONS

Yan Pailhas et al., "Synthetic Aperture Imaging and Autofocus With Coherent MIMO Sonar Systems", http://osl.eps.bw.ac.uk/files/uploads/publications/SASSARconf_Pailhas.pdf (2014).

(Continued)

*Primary Examiner* — Matthew M Barker
(74) *Attorney, Agent, or Firm* — Browdy and Neimark, PLLC

(57) ABSTRACT

There is provided methods and device for imaging objects comprising unsupervised classifying and data analyzing of the object to detect and identify the structure of the object and further display the object's structure underlying structure, for example the arrangement of and relations between the parts or elements of the object by using a location module configured to record the physical location of an antenna array.

8 Claims, 3 Drawing Sheets

(56) References Cited

U.S. PATENT DOCUMENTS

| | | | |
|---|---|---|---|
| 5,572,160 | A | 11/1996 | Wadell |
| 5,573,012 | A | 11/1996 | McEwan |
| 5,583,510 | A | 12/1996 | Ponnapalli |
| 5,718,208 | A | 2/1998 | Brautigan |
| 5,774,801 | A | 6/1998 | Li et al. |
| 5,829,522 | A | 11/1998 | Ross |
| 6,400,306 | B1 | 6/2002 | Nohara |
| 6,636,816 | B1 | 10/2003 | Dvorak et al. |
| 7,034,548 | B2 | 4/2006 | Anderson et al. |
| 7,148,702 | B2 | 12/2006 | Wong et al. |
| 7,236,120 | B2 | 6/2007 | Healy |
| 7,387,010 | B2 | 6/2008 | Sunshine |
| 7,448,880 | B2 | 11/2008 | Osaka |
| 7,486,220 | B1 | 2/2009 | Kronfeld |
| 7,668,046 | B2 | 2/2010 | Banker |
| 7,679,545 | B2 | 3/2010 | Rausch |
| 7,755,010 | B2 | 7/2010 | Godshalk |
| 8,050,740 | B2 | 11/2011 | Davis |
| 8,077,072 | B2 | 12/2011 | Mohamadi |
| 8,095,204 | B2 | 1/2012 | Smith |
| 8,250,481 | B2 | 8/2012 | Klaric |
| 8,494,615 | B2 | 7/2013 | Melamed et al. |
| 8,593,157 | B2 | 11/2013 | Adams |
| 8,620,238 | B2 | 12/2013 | Chan et al. |
| 9,194,819 | B2 | 11/2015 | Bulumulla |
| 9,373,051 | B2 | 6/2016 | Viviani |
| 2002/0165295 | A1 | 11/2002 | Matsumoto |
| 2003/0115232 | A1 | 6/2003 | Lipp |
| 2003/0146767 | A1 | 8/2003 | Steele |
| 2004/0015087 | A1 | 1/2004 | Boric-Lubecke |
| 2004/0077943 | A1 | 4/2004 | Meaney |
| 2004/0190377 | A1 | 9/2004 | Lewandowski |
| 2005/0040832 | A1 | 2/2005 | Steele et al. |
| 2005/0255276 | A1 | 11/2005 | Bethune |
| 2006/0034726 | A1 | 2/2006 | Sunshine et al. |
| 2006/0176062 | A1 | 8/2006 | Yang et al. |
| 2006/0220658 | A1 | 10/2006 | Okamura |
| 2007/0150194 | A1 | 6/2007 | Chirikov |
| 2007/0205937 | A1 | 9/2007 | Thompson |
| 2008/0077015 | A1 | 3/2008 | Boric-Lubecke |
| 2008/0296306 | A1 | 12/2008 | Handa |
| 2009/0033548 | A1 | 2/2009 | Boxman |
| 2010/0100548 | A1 | 4/2010 | Scott |
| 2010/0152600 | A1 | 6/2010 | Droitcour et al. |
| 2011/0060215 | A1 | 3/2011 | Tupin |
| 2011/0068807 | A1 | 3/2011 | Kesil et al. |
| 2011/0098972 | A1 | 4/2011 | Chen et al. |
| 2011/0134001 | A1 | 6/2011 | Sakata |
| 2011/0237939 | A1 | 9/2011 | Melamed |
| 2011/0238339 | A1 | 9/2011 | Fericean et al. |
| 2012/0022348 | A1 | 1/2012 | Droitcour et al. |
| 2012/0112949 | A1 | 5/2012 | Morgan |
| 2012/0242341 | A1 | 9/2012 | Olsson |
| 2012/0327666 | A1 | 12/2012 | Liu |
| 2013/0141287 | A1 | 6/2013 | Pallonen |
| 2013/0231046 | A1 | 9/2013 | Pope |
| 2013/0241780 | A1 | 9/2013 | Amm et al. |
| 2013/0271328 | A1 | 10/2013 | Nickel |
| 2013/0300573 | A1 | 11/2013 | Brown |
| 2013/0329139 | A1 | 12/2013 | Feher |
| 2014/0066757 | A1 | 3/2014 | Chayat |
| 2014/0179239 | A1 | 6/2014 | Nickel |
| 2014/0276031 | A1 | 9/2014 | Lomnitz |
| 2014/0278445 | A1 | 9/2014 | Eddington, Jr. et al. |
| 2015/0078642 | A1 | 3/2015 | Fang |
| 2015/0097579 | A1 | 4/2015 | Sharma et al. |
| 2015/0177372 | A1 | 6/2015 | Poisner |
| 2016/0019458 | A1 | 1/2016 | Kaufhold |
| 2016/0336643 | A1 | 11/2016 | Pascolini |
| 2016/0378117 | A1 | 12/2016 | Szatmary |

FOREIGN PATENT DOCUMENTS

| | | |
|---|---|---|
| WO | 2016174675 A2 | 11/2016 |
| WO | 2016174680 A2 | 11/2016 |

OTHER PUBLICATIONS

Fineup, J., "Synthetic-aperture radar autofocus by maximizing sharpness", http://www.opties_rochester.edu/workgroups/fineup/PUBLICATIONS/OL00_SARFocMaxSharp.pdf (2000).

Bates, James Stewart, "Expansions and Discussions of the Phase Gradient Algorithm", http://digitalcommons.usu.edu/cgi/viewcontent.cgi?article=1320&context=spacegrant (1998).

R. Streich et al., "Accurate imaging of multicomponent GPR data based on exact radiation patterns," IEEE Transactions on Geoscience and Remote Sensing, vol. 45, 93-103 (2007).

Crocco L et al: "Early-stage leaking 1-13 pipes GPR monitoring via microwave a tomographic inversion" Journal of Applied Geophysics. Elsevier. Amsterdam. NL. vol. 67. No. 4. Apr. 1, 2009 (Apr. 1, 2009). pp. 270-277. XP026033856.

Ayliffe et al., 'Electric Impedance Spectroscopy Using Microchannels with Integrated Metal Electrodes' IEEE Journal of Microelectromechanical Systems, vol. 8, No. 1, Mar. 1999.

P. Lombardini et al., "Criteria for the Design of Loop-Type 12 Directional Couplers for the L Band" (1956).

Pallavi R. Malamel et al., "Microwave Reflectometry Based Electrical Characterization of Milk for Adulteration Detection", Advance in Electronic and Electric Engineering, ISSN 2231-1297, vol. 4, No. 5 (2014), pp. 487-492.

Valerie Favry, "Design and Development of a Novel Electronic Sensor for Detecting Mastitis Based on Conductance/Impedance Measurements", Thesis submitted for the Degree o f Master o f Science,Supervised by Prof. Dermot Diamond School o f Chemical Sciences, National centre for Sensor Research Jul. 2004.

Ali F. Yegulap et al., "Minimum Entropy SAR Autofocus", http://www.ll.mit.edu/asap/asap_99/abstract/Yegulap.pdf (1999).

David Atkins et al., "Motion Correction", ISMRM 2011 Montreal Sunrise Course: Image Reconstruction (2011).

Gary F. Margrave et al., "Full Waveform Inversion Using One-way Migration and Well Calibration", IEEE Transactions on Antennas and Propagation, vol. 54, No. 11, Nov. 2006.

David Winters, "Estimation of the Frequency-Dependent Average Dielectric Properties of Breast Tissue Using a Time-Domain Inverse Scattering Technique", IEEE Transactions on Antennas and Propagation, vol. 54, No. 11, Nov. 2006.

Bjorn Engquist et al., "Application of the Wasserstein Metric to Seismic Signals", Communications in Mathematical Sciences, Nov. 2013.

D. Wahl et al., "Phase Gradient Autofocus—A Robust Tool for High Resolution SAR Phase Correction", IEEE Transactions on Aerospace and Electronic Systems vol. 30, No. 3 Jul. 1994.

Ming et al.,"Radar signals clustering based on spectrum atom decomposition and kernel method", Measurement, Information and Control (ICMIC), 2013 International Conference, pp. 843-846 (Aug. 2013).

Gong et al.,"A clustering based dual model framework for EIT imaging: first experimental results" Current Directions in Biomedical Engineering, pp. 278-282, vol. 1, Issue 1 (Sep. 2015.

Boughton et al.,"Mass spectrometry imaging for plant biology: a review", Phytochem Rev, pp. 445-488, vol. 15 (Oct. 2015).

Mink et al.,"Radar signals clustering based on spectrum atom decomposition and kernel method", Measurement, Information and Control (ICMIC), 2013 International Conference, pp. 843-846 (Aug. 2013).

Zhu et al.,"The Application of Unsupervised Clustering in Radar Signal Preselection Based on DOA Parameters", Pervasive Computing Signal Processing and Applications (PCSPA), 2010 First International Conference, pp. 956-959 (Sep. 2010).

Havens et al.,"Locally-Adaptive Detection Algorithm for Forward-Looking Ground-Penetrating Radar", Dept. of Electrical and Computer Engineering, (2010).

Abdi, H. & Williams, L.J. (201 0). Normalizing data. in N.J. Salkind, D.M., Dougherty, & B. Frey (Eds.): Encyclopedia of Research Design. Thousand Oaks (CA): Sage. pp. 935-938.

P. K. Verma, A. N. Gaikwad, D. Singh, and M. J. Nigam, "Analysis of clutter reduction techniques for through wall imaging in UWB

(56) References Cited

OTHER PUBLICATIONS range," Progress in Electromagnetics Research B, vol. 17, 29-48, 2009. doi: 1 0.2528/PIERB09060903.

SYSTEM, DEVICE AND METHOD FOR IMAGING OF OBJECTS USING SIGNAL CLUSTERING

CROSS-REFERENCE

The present application claims the benefit of U.S. Provisional Application Ser. No. 62/260,582, filed on Nov. 29, 2015, entitled "SYSTEM, DEVICE AND METHOD FOR IMAGING OF OBJECTS USING SIGNAL CLUSTERING" which is incorporated herein by reference in its entirety.

The subject matter of the present application is also related to PCT Application PCT/IL2016/050440, filed on Apr. 26, 2016, entitled "SYSTEM DEVISE AND METHOD FOR ESTIMATING DIELECTRIC MEDIA PARAMETERS"; PCT Application PCT/IL2016/050448, filed on Apr. 29, 2016, entitled "SYSTEM, DEVICE AND METHOD FOR LOCALIZATION AND ORIENTATION OF ANTENNA ARRAY FOR RADIO FREQUENCY IMAGING"; each of which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present invention relates to a system, device and method for imaging an object or substances and more specifically, but not exclusively, to MIMO (multiple-input and multiple-output) radar imaging such as in-wall imaging in the UWB (ultra-wideband) frequency range.

BACKGROUND

A known and unsolved problem, which challenges rescue forces such as the police and army on their day-to-day activity, includes the detection of hidden objects, such as weapons or explosives hidden behind a wall of a building, concealed on individuals, or underground. In-wall (or through wall) imaging solution may also be desirable for use as part as a hand held device such as a mobile device, e.g. smart phone tablet or PC for a variety of applications to provide the mobile devise user information related to data in areas that cannot be imaged via the devise's standard camera.

Known solutions for in-wall imaging include for example radio frequency (RF) and other sensing methods to penetrate wall materials and optimally estimate the content and structure of an object such as wall.

Other known solutions which include imaging objects and substances such as in-wall imaging, for example imaging walls made of hollow-blocks, drywalls, or walls composed of several layers (e.g. hollow block, plaster and ceramic), by directing confocal imaging of the medium are not sufficient and lack accuracy since, inherently, in-wall imaging includes imaging inhomogeneous objects, including hidden and unknown parameters and elements.

Prior methods and apparatus for in-wall or through wall imaging can be less than ideal in at least some respects. For example standard in-wall imaging solutions attempt to find reflectors (e.g. using a single pair of TX-RX antennas) rather than detect structure, and in most cases the performance deteriorates when operating in composite media such as hollow-blocks.

In view of the above it would be desirable to provide improved imaging device that overcome at least some of the aforementioned problems with the prior art.

REFERENCES

Bo Gong, Benjamin Schullcke, Sabine Krueger-Ziolek, Knut Moeller1, "A clustering based dual model framework for EIT imaging: first experimental results," Current Directions in Biomedical Engineering. Volume 1, Issue 1, Pages 278-282, ISSN (Online) 2364-5504, DOI: 10.1515/cdbme-2015-0069, September 2015.

Berin A. Boughton. Dinaiz Thinagaran, Daniel Sarabia. Antony Bacic. Ute Roessner, "Mass spectrometry imaging for plant biology: a review".

Zhu Ming; Wu Sidong; Fu Kechang; Jin Weidong, "Radar signals clustering based on spectrum atom decomposition and kernel method," in Measurement, Information and Control (ICMIC), 2013 International Conference on, vol. 02, no., pp. 843-846, 16-18 Aug. 2013.

Xiang-Peng Zhu; Ming Jin; Wei-Qiang Qian; Shuai Liu; Yu-Mei Wei, "The Application of Unsupervised Clustering in Radar Signal Preselection Based on DOA Parameters," in Pervasive Computing Signal Processing and Applications (PCSPA), 2010 First International Conference on, vol., no., pp. 956-959, 17-19 Sep. 2010.

Timothy C. Havens*a, K. C. Hoa, Justin Farrella, James M. Kellera, Mihail Popescua, Tuan T. Tonb, David C. Wongb, and Mehrdad Soumekhc, "Locally-Adaptive Detection Algorithm for Forward-Looking Ground-Penetrating Radar", Dept. of Electrical and Computer Engineering, University of Missouri, Columbia, Mo., USA 65211.

SUMMARY OF INVENTION

Prior to the summary of the invention being set forth, it may be helpful to set forth definitions of certain terms that will be used hereinafter.

The term "discrimination method" as used herein is defined as a method operated over a set of data vectors, whose output is a short description of each data vector in the set, by means of an index or a smaller vector of numbers, with the purpose of discriminating different types/categories of vectors in the data set from each other. For example, clustering (i.e. assigning an index to each vector), or PCA (Principal component analysis) are discrimination methods.

The term "type" as used herein is defined as a short description assigned to data vector in the set.

According to a first aspect of the invention there is provided a device for imaging an object, the object comprises a plurality of parts, the device comprising: an antenna array comprising a plurality of antennas; a measurement unit configured to transmit signals to the antenna array and to receive signals from the antenna array; and a processor in communication with said measurement unit, said processor is configured to discriminate the received signals into types or categories, and generate an image of said object.

In an embodiment, said types are displayed by a displayer according to the location where the received signals were measured on said object.

In an embodiment, said measurement unit is configured to perform a reflective measurement by either a frequency sweep or a time pulse.

In an embodiment, said measurement unit is configured to extract phase and amplitude of the received signals.

In an embodiment, the processor is configured to cluster said signals into at least two groups.

In an embodiment, the processor is configured to discriminate said received signals according to a Principal Component Analysis (PCA).

In an embodiment, the processor is configured to discriminate said received signals by comparing each signal of said received signals to other signals of said received signals by means of a distance metric, and allocate a high rank to signals which are significantly different than other signals as indicated by a high value of the said distance metric.

In an embodiment, the device further comprising a location module configured to record the physical location of the antenna array and wherein the signals are measured by sliding the antenna array along a the surface of the object of interest, and wherein each signal is tagged with the physical location at which it was measured.

In an embodiment, the processor is configured to cluster said tagged signals into at least two groups.

In an embodiment, the processor is configured to discriminate said signals by using Principal Component Analysis (PCA).

In an embodiment, the processor is configured to discriminate said signals by comparing each signal to other signals, and allocate a high rank to signals which are significantly different than other signals.

In an embodiment, the processor is configured to display average properties of said signals.

In an embodiment, said average is an average power in a specific time range or mean delay. In an embodiment, said measurement unit comprises at least one transceiver, a signal generation and reception unit and an extraction unit.

According to a second aspect of the invention there is provided a method of imaging the inner structure of an object, the method comprising: scanning the object by a device, said device comprises an antenna array, a measurement unit configured to transmit signals to the antenna array and to receive signals from the antenna array, and a processor for analyzing said received signals; collecting the RF received signals into a form of time signals tagged with physical location for limiting the time signals to a region of interest; centering the received signals; arranging the received signal as a vector of data points; discriminating the data vectors into types; and displaying the types by a displayer.

In an embodiment, the centering of the received signals comprises removing the mean over all locations from the time signals.

In an embodiment, the method further comprising normalizing the received signals by estimating an empirical standard deviation per time point and signal, and dividing by said standard deviation.

In an embodiment, said standard deviation is estimated by averaging the signal strength over a window of adjacent points in time.

In an embodiment, said discrimination step is performed according to methods selected from the group consisting of: clustering, distance from cluster center, PCA (Principal Component Analysis), anomaly error, RMS (compute an average delay) and intensity per time range.

In an embodiment, the method further comprising calibrating the received signals by dividing the received signals by a known reference signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION

Figure 1:
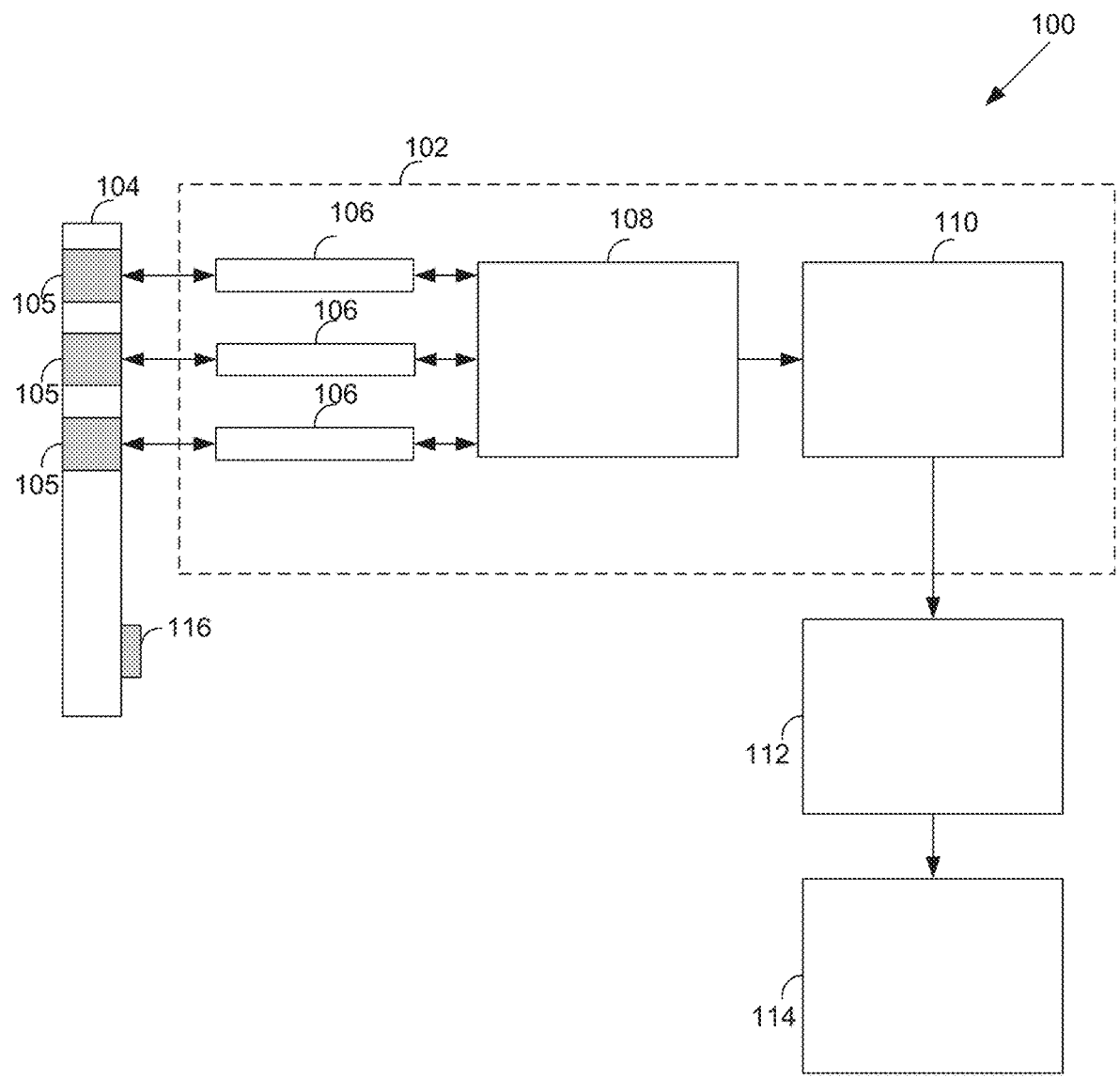
FIG. 1 shows a schematic diagram of an imaging device, according to an embodiment of the invention.

The present invention relates to a system, device and method for imaging an object or substances and more specifically, but not exclusively, to MIMO (multiple-input and multiple-output) radar imaging such as in-wall imaging in the UWB frequency range.

According to some embodiments there are provided methods and device for imaging objects comprising unsupervised classifying and data analyzing of the object to detect and identify the structure of the object and in some cases further displaying the object's structure/underlying structure, e.g. the arrangement of and/or relations between the parts or elements of the object, according to the methods (for example discrimination methods) specified hereafter.

In some embodiments there are provided methods and devices to identify the surface and internal parts of an object such as an object comprising several parts (e.g. a hollow block containing cavities) by clustering the object's parts to a number of groups. In an embodiment, the clustering step comprises detecting or identifying that some parts of the object are of type "A" while others parts are of type "B" and providing an image of the object, the image illustrating the identified parts of the object (e.g. clustering information, or structure data such as type "A" and "B" parts). It is stressed that though the exact type of the object or the internal parts of the object are not identified in accordance with embodiments the structure of the object is identified and may be imaged.

In some cases methods and device in accordance with embodiments may be used to detect the structure of a wall/medium (e.g. distinguish concrete from hollow block).

In some cases, methods and device in accordance with embodiments may be used for through-wall imaging (mainly of nearby objects), scanning of materials e.g. in production lines, etc.

The device is configured to or may scan an object or one or more elements such as a wall or a surface. In operation, a plurality of signals are transmitted for example towards the wall/medium and the reflected signals are recorded (e.g. over a large bandwidth) by a waveform recording or frequency response recording unit or module, producing a measurement for a given location. This process is henceforth referred to as "measurement".

In some embodiments, a location unit or module such as an IMU (inertial measurement unit) or any other known device or method is used to record the physical location at which each measurement is taken. Then, the measurements are discriminated in one of several known discrimination methods e.g. clustering, and an image which describes the classification result is presented for example on a monitor device.

In some cases methods and devices in accordance with embodiments may be used to detect anomalies in a repetitive structure, while cancelling out the deviations of the structure itself (e.g. in a hollow-block wall, detect that a group of blocks is different than the others, suggesting perhaps a leak, a pipe, or a different construction).

In some instances methods and devices in accordance with embodiments may be used to detect objects behind a wall or surface.

In other instances the information gathered according to imaging methods described herein may serve as prior information for imaging and medium estimation methods. For example, confocal imaging methods require knowledge of the dielectric constant or propagation velocity. For example, a three step procedure may be used. In the first stage, the wall is scanned as described herein, and parts of the object with different materials are identified (for example, part of the wall is drywall and part is a concrete); at the second stage, the dielectric constant of each part of the object is estimated from the signals recorded in each part (for example by methods as illustrated by the present invention applicant's PCT Application PCT/IL2016/050440, filed on Apr. 26, 2016, entitled "SYSTEM DEVISE AND METHOD FOR ESTIMATING DIELECTRIC MEDIA PARAMETERS"). At the third stage, an imaging method is utilized according to the parameters estimated for each part of the object separately.

Advantageously, the device and methods according to the invention do not require any prior knowledge on the object's modeling, for example, the type of material, depth of arena, types of targets. Additionally, it yields an image of the underlying structure, which does not exist in prior in-wall imaging devices.

Reference is now made to FIG. 1 illustrating schematically a device 100 in accordance with some embodiments.

The device 100 comprises an antenna array 104, a measurement unit 102 configured to transmit signals to the antenna array and to receive signals from the antenna array, one or more processors 112 configured to discriminate the received signals into types or categories and a display or monitor device 114 for displaying the structure of the object.

Figure 2:
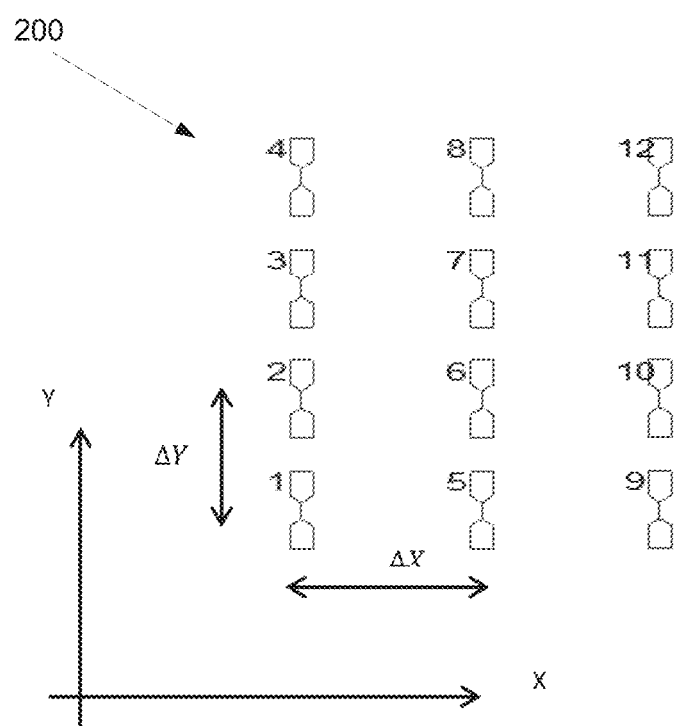
FIG. 2 shows a schematic diagram of an antenna array, according to an embodiment of the invention.

The antenna array comprises a plurality of antennas 105. The antenna array may be for example a 4×3 antenna array. An example of such antenna array is illustrated in FIG. 2 which shows antenna array 200 comprising twelve antennas. The measurement unit 102 may comprise at least one transmitter and at least one receiver (e.g. transceiver 106), a signal generation and reception unit 108 and an extraction unit 110 such as an S-parameter extraction unit.

In some cases, each antenna 105 of the antenna array 104 may be connected to a transceiver(s), such as transceiver 106 acting as transmitter(s) and/or a receiver(s). In some embodiments the transceiver(s) 106 are operated in the UWB band (e.g. 3-10 Ghz) and may perform a reflective measurement by either a frequency sweep or a time pulse. The signal generation and reception unit 108 generates the signals sent to the transmitters and records the signals from the receivers. The recorded signals may be further processed by the S-parameter extraction unit 110, which for example, extracts the phase and amplitude of each received signal, and may perform various calibration procedures as known in the art. Such calibration procedures may include for example division by a reference signal, SOLT (Short-Open-Load) calibration, etc. The S-parameter extraction unit 110 may further convert the result (i.e. phase and amplitude of each received signal) to time-domain by for example means of inverse Fourier transform for example in cases of frequency-domain measurements. The result of such measurements is an impulse response function between two antenna ports of interest, which will be henceforth defined as "signal" result associated with the given antenna ports. This signal (impulse response) is affected by direct leakage between antennas but may also be affected by the interfacing medium, and objects/material within it.

In some cases the antenna 104 or the measurement unit 102 may be connected to or be in communication with a measurement unit or module such measurement unit 116.

Figure 3:
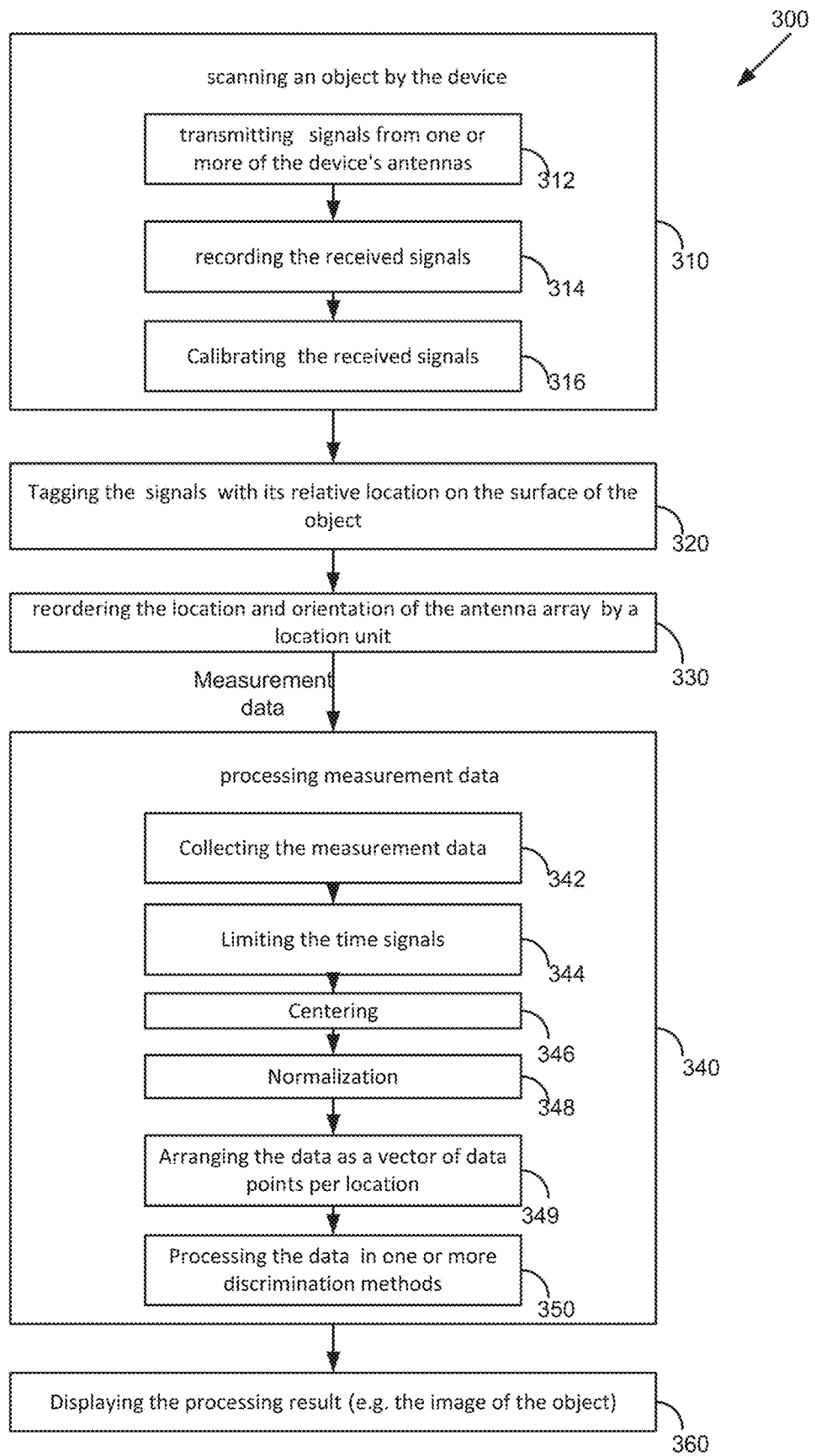
FIG. 3 shows a flow chart of a method of in-wall object imaging, according to an embodiment of the invention.

FIG. 3 is a flowchart illustrating a method 300 for imaging an object, such as an object which comprises a plurality of parts and displaying the structure of the object. The image of the object may include for example a display of the surface and inner portions of the object, such as in-wall imaging or through wall imaging, in accordance with embodiments. The method starts at a sweep step 310 which includes scanning an object such as a wall or a surface by the device (e.g. device 100) by physically transferring the device along (for example in proximity to or on) the object. The sweep step 310 includes transmitting signals from one or more of the device's antennas (step 312) and recording the received signals (step 314). As an example, a signal may be transmitted from each antenna and received by another antenna. In such case transmission coefficient ("S21" in microwaves' terminology) is measured.

In other instances, the receive antenna may be the same as the transmit antenna, so that the reflection coefficient ("S11" in microwaves' terminology) is measured. The reflected signals can be recorded in addition to, or instead of, measurements between different antennas ("through" measurements). These may be used to increase resolution and/or in order to reduce the number of antennas needed (to 1 in the extreme case).

At step 320, the signals, for example each signal is tagged with its relative location on the surface of the object. For example, as illustrated in FIG. 2, a signal transmitted from antenna 1 and received by antenna 5 (denoted 1→5) of antenna array 200 is assumed to represent a location lower by ΔY in the vertical direction compared to the signal (2→6) while the signal 5→9 is considered to be ΔX to the right of the signal 1→5, where ΔX, ΔY denote the antenna spacing in each axis of the antenna array in respect to a Cartesian axis (X-Y-Z) that is illustrated in FIG. 2. While the antenna array is moved along the surface, at step 330 the location and orientation of the antenna array are recorded continuously by a location unit (such as inertial, optical or mechanical unit which may be in communication or included in the imaging device), and the signals recorded at that point are tagged with their physical locations along the surface (relative to the starting point).

In some cases, several signals (e.g. measurements) may be used during the processing together (e.g. concatenated or arranged into a vector or an array), to comprise a data set for a single location. For example in some cases for the physical location of antenna 5 (as shown in FIG. 2), the recorded signals (5→5, 1→9, 5→9, 5→1) will be aggregated in order to characterize a point on the object. In other cases, antennas at different polarizations may be used in order to capture different polarimetric features of each point (e.g. VV,HH, HV reflections) of the scanned object. At each physical position of the array, several such sets may be recorded and associated with different locations on the object. For example, the set 5→5, 1→9, 5→9, 5→1 of antenna array 200 is associated with the center of the bottom row in the array 200, and there are 3 other such sets associated with each of the other rows (for example, the respective set for the top row is 8→8, 4→12, 8→12, 8→4).

In some cases, calibration of the signals (step 316) may be required in order to cancel out the effect of different trace/cable lengths and electrical characteristics, e.g. by dividing the received signals by a known reference signal. As the main purpose of calibration is to guarantee that the same physical reflection at different antenna pairs will be translated to the same recorded signal, this calibration may be learned and improved (trained) through the measurement process (without having to use a reference signal or target). For example, a measurement of one or more symmetric targets (targets that yield the same reflected signals in all antennas, for example a mirror surface positioned parallel to the array at a distance of 10 cm from the array) may be performed, and the reference signal may be determined so as to bring the signals after division by the reference signal to be equal for all such targets. In the simplest case, the reference signal may be chosen as the received signal measured for one of the said symmetric targets.

At step 340, the measurement data is processed as follows:

1. Collecting the measurement data into a form of time signals (step 342). For example the time signals are tagged with physical location (each physical location may be associated with one or more time signals, represented as a matrix of M time signals by N points). For example, a device operating in the UWB band (3-10 Ghz) and sampling at 50 Mhz spacing, and after conversion to time domain by 2048-point IFFT, may produce signals with N=2048 samples, covering the range 0 to 20 ns (1/50 Mhz) with sampling frequency 2048/20 ns=102 Ghz. Referring to example given above for the 4×3 array 200, when 4 antenna pairs are associated with each point, the matrix dimensions are M=4 by N=2048, and 4 such matrices are recorded for each location (each associated with a different row in the array and tagged with a different location on the surface).

2. Limiting the time signals (step 344) to a region of interest (to determine approximate depth range). For example, if the depth of arena of interest is 20 cm and it is assumed the dielectric constant does not exceed 5, the maximum two-way propagation time is 0.3 ns. Continuing the above example, the M=4 by N=2048 matrix will be trimmed to M=4 by N=32 matrix (N=32 samples roughly representing 0.3 ns).

3. Centering (step 346): Removing the mean over all locations from all time signals.

4. Normalization (step 348): Normalization is performed by estimating the empirical standard deviation (over all locations) per time point and signal, and dividing by this standard deviation.
   a. In some embodiments the standard deviation may be estimated by averaging the signal strength over a window of adjacent points in time (providing a local normalization of the signal).
   b. In other embodiments, the standard deviation is estimated from the multitude of data points associated with the same pair and location. i.e. if L matrices of size M×N were collected for L locations, the standard deviation estimate is an M×N matrix where the element m,n is the standard deviation of an L-element vector containing the (m,n) elements of each of the L data matrices.
   c. In other embodiments an estimate of standard deviation combining fixed (a-priori) assumed standard deviation, and the two aforementioned estimates is used.

5. Arranging the data (step 349) as a vector of data points per location (composed of all M×N time points after processing). If L locations were measured (including physical locations and locations of different antenna-sets in the array), then a matrix of size L times MN is formed, where each line (vector) in the matrix is tagged with a physical location.

6. Discrimination (step 350): Processing the data matrix in one or more discrimination methods described below, to obtain the discrimination information.

7. Displaying the processing result (step 360), e.g. the image of the object, by displaying an image comprising the discrimination information, each displayed at a point matching the physical location.

In some embodiments the processor is configured to provide or activate several modes of discrimination as follows:

Clustering: the data sets are clustered to a given number of clusters (e.g. Nc=10 clusters), and the image may comprise a color map where the color represents the cluster index. Clustering may be done using one of several known methods such as k-means clustering, Gaussian mixture models, and so forth.

Distance from cluster center for each data vector, the distance from the cluster-center associated with the cluster of that data vector may be used as an indication of anomaly and/or success of clustering for that vector. It may be displayed as an image or used to determine the intensity of each point in the cluster-map (i.e. color denotes cluster index, intensity denotes closeness to cluster center). The following expression may be used for normalized intensity:

$$c_{intensity}[i] = \frac{\sigma^2_{Cluster[i]}}{\sigma^2_{Cluster[i]} + \|\text{data}[i] - \text{center}\{\text{cluster}[i]\}\|^2}$$

where:
cluster[i] is the cluster index associated with data vector i, center{c} is the cluster center vector, $\sigma_c^2$ is the cluster variance (the mean of $\|\text{data}[i]-\text{center}\{\text{cluster}[i]\}\|^2$ over all points in the cluster). Other distance metrics may be used as well.

Principal component analysis (PCA)—PCA is applied to the data matrix, and several (e.g. 3) strongest PCA coefficients are translated to image colors. Other variants of PCA such as non-linear/multi-linear PCA, or N-way PCA (higher order), well known in the art, may be used.

Anomaly error: find the distance from closest signal amongst all signals outside a "window" (i.e. not including the locations directly surrounding the location associated with the signal). The distance may be calculated using L2 norm, and/or by extracting an empirical covariance matrix from the data and using $\text{dist}^2(x_1, x_2)=(x_1-x_2)^*\Lambda^{-1}(x_1-x_2)$ as the distance metric. This distance metric is well known in the art as means for highlighting deviations from the overall distribution (see ref [5]). Alternatively, the distance from the mean signal may be presented (i.e. replacing $x_2$ with the mean of all vectors in the data matrix), or the covariance matrix $\Lambda$ may be estimated for each cluster separately.

RMS delay: compute an average (RMS) delay of each of the time domain signals, e.g. using $$T_{rms} = \frac{\int t \cdot |x(t)|^2 dt}{\int |x(t)|^2 dt}$$

Signal intensity at various depth ranges. For example, the signal intensity (at each point) may be measured for 3 depth ranges for each location (since the propagation velocity is not known, the depth ranges are actually time ranges), and encoded to RGB color.

In some cases, following a rough discrimination process over the surface, the user may select an area to focus on and re-run the discrimination method on that area, in order to give finer details of the material. For example, after observing two distinct structures in a wall, the user would like to focus on each part and determine its internal structure. In some cases, no additional signal acquisition is needed, and the process is based on the signals recorded in the first sweep.

In some cases, on-line clustering/analysis of the data may be performed in order to present to the user the type of material during the scan itself.

In some cases, the location information of the antenna array in each given moment is further improved upon using the data collected as described above. For example, if the locations provided are in-accurate, then after laying the discrimination data into a 2D image, there might be shifts between rows and/or columns of the image. These small shifts can be estimated and corrected, e.g. using cross correlation between adjacent "rows" or "columns". The shift estimation (e.g. cross correlation) may be applied to the image pixels, the discrimination data, or directly to the signals (the M×N data matrices) associated with each location. This can be used in order to improve the row and column alignment in the case of location drifts.

In some cases, a static array may be used for obtaining the same information from multiple antenna locations, without involving a physical motion.

In some cases, the same concepts of obtaining discrimination information may be applied to the temporal rather than the spatial domain. For example, radar measurements of the same room are taken at different times, and a discrimination method is used in order to separate out different situations (e.g. detect if one or two cars are park in the garage; detect an abnormal situation).

The description above relates to discrimination operated over the signal represented in time domain; however the same processing can be applied to different representations of the data. For example, direct processing of signals in frequency domain (without time to frequency conversion, if they are measured in frequency), by observing the complex phasors, the amplitudes or the phases, with or without additional filtering.

In some embodiments of the invention, a discrimination process may be performed on spatially processed signals rather than the directly recorded signals; for example, beamforming, which is well known in the art, where signals from different antennas are combined with complex weights or time delays, in order to maximize reception from a certain spatial direction. Alternatively, imaging methods such as delay-and-sum (DAS), a collection of signals from all antenna pairs are first processed (by applying time delays in the case of DAS) to create a vector comprising of a sample from each pair, and then summed to generate the image for a certain voxel. The discrimination methods can be applied to the vector of samples before summation.

In further embodiments, the processing unit or one or more processors may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, parameters of the discrimination method (for example, depth range, number of clusters) are chosen by various criteria on the resulting image, such as to highlight the properties that might be of more interest to the user. For example, selecting the depth range to operate upon (from a set of possible ranges), by minimizing a metric, such as Total Variation metric on the resulting image. The rationale is to search for the depth range in which the result appears to be an image of some object, rather than random noise.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for imaging an object, the object comprising a plurality of parts, the device comprising:
   an antenna array comprising a plurality of antennas;
   a measurement unit configured to transmit signals to the antenna array, to receive signals from the antenna array; and
   a processor in communication with said measurement unit to receive signals transmitted from the measurement unit, said processor is configured to:
      arrange the received signals as vectors of data points per location;
      process the vectors of data points per location to obtain discrimination information,
      group the vectors of data points into clusters;
      assign a cluster index for each signal of said vectors of data points such that signals belonging to the same cluster have the same cluster index, and translating said cluster indices to colors according to a color map where each color is associated to a cluster index to obtain said discrimination information; and
      display an image of the object, said image comprising said discrimination information, wherein each discrimination information relates to a point matching a physical location.

2. The device of claim 1, comprising a location module, said location module is configured to record the physical location of the antenna array, wherein the signals are measured by sliding the antenna array along a surface of the object, and wherein each of the received signals is tagged with the physical location at which it was measured.

3. The device of claim 2, wherein the processor is configured to provide an average of said tagged signals.

4. The device of claim 3, wherein said average is the signal average power in a specific time range or in a specific mean delay.

5. The device of claim 1, wherein the processor is further configured to, for each vector of said vectors of data points, calculate a distance from the cluster center associated with the cluster of that vector, and use said distance to determine the intensity of each point in the said display of the object image.

6. The device of claim 1, wherein said measurement unit is configured to perform a reflective measurement by either a frequency sweep or a time pulse.

7. The device of claim 1, wherein said measurement unit is configured to extract phase and amplitude of the received signals.

8. The device of claim 1, wherein said measurement unit comprises at least one transceiver, a signal generation and reception unit and an extraction unit.

\* \* \* \* \*